US007831243B2

(12) United States Patent
Thomas

(10) Patent No.: US 7,831,243 B2
(45) Date of Patent: Nov. 9, 2010

(54) COMMUNICATIONS DEVICE, SYSTEM AND METHOD FOR PERSONALIZED CONTENT DELIVERY

(75) Inventor: Gary D. Thomas, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 624 days.

(21) Appl. No.: 11/160,221

(22) Filed: Jun. 14, 2005

(65) Prior Publication Data

US 2007/0019795 A1   Jan. 25, 2007

(51) Int. Cl.
H04W 4/00   (2009.01)
(52) U.S. Cl. .................. 455/414.1; 455/3.04; 455/456.3
(58) Field of Classification Search .................. 455/411, 455/456.3
See application file for complete search history.

(56) References Cited

U.S. PATENT DOCUMENTS

| 7,139,557 | B2* | 11/2006 | Tang et al. ............... 455/414.2 |
| 2002/0081972 | A1* | 6/2002 | Rankin ........................ 455/41 |
| 2003/0013449 | A1* | 1/2003 | Hose et al. .................. 455/440 |
| 2003/0017826 | A1* | 1/2003 | Fishman et al. ............ 455/426 |
| 2003/0115278 | A1* | 6/2003 | Goker ........................ 709/207 |
| 2003/0172090 | A1 | 9/2003 | Asunmaa et al. |
| 2003/0228842 | A1* | 12/2003 | Heinonen et al. .......... 455/41.2 |
| 2004/0224699 | A1 | 11/2004 | Bull |
| 2005/0059389 | A1* | 3/2005 | Minko ........................ 455/423 |
| 2006/0048196 | A1* | 3/2006 | Yau ............................. 725/81 |
| 2006/0161621 | A1* | 7/2006 | Rosenberg ................... 709/204 |
| 2007/0021111 | A1* | 1/2007 | Celik .......................... 455/418 |
| 2007/0197261 | A1* | 8/2007 | Humbel ...................... 455/558 |

FOREIGN PATENT DOCUMENTS

| JP | 9148994 A | 6/1997 |
| JP | 11066081 A | 3/1999 |
| JP | 2001308808 A | 11/2001 |
| JP | 2002014996 A | 1/2002 |
| JP | 2004118479 A | 4/2004 |
| JP | 2005128953 A | 5/2005 |

OTHER PUBLICATIONS

PCT International Preliminary Report on Patentability (PCT/US2006/000793) dated Jul. 6, 2007.
PCT International Search Report for corresponding PCT Application (PCT/US2006/000793) dated Jun. 27, 2006.
PCT International Written Opinion of the International Searching Authority (PCT/US2006/000793) dated Jun. 27, 2006.
Japanese Patent Office; Office Action; Aug. 9, 2010; issued in Japanese Patent Application No. 2008-516815.

* cited by examiner

Primary Examiner—Charles N Appiah
Assistant Examiner—Jaime M Holliday
(74) Attorney, Agent, or Firm—R. Brian Drozd; Moore & Van Allen PLLC

(57) ABSTRACT

A method, system and/or computer program product for personalized content delivery may include transmitting a signal to request a user's personal preferences, wherein the user's personal preferences may be stored in one of a memory of a communications device, a SIM or a U-SIM or the like. The method, system and/or computer program product may further include delivering a specific content in response to one of the user's personal preferences or personal preferences of a majority of users.

25 Claims, 4 Drawing Sheets

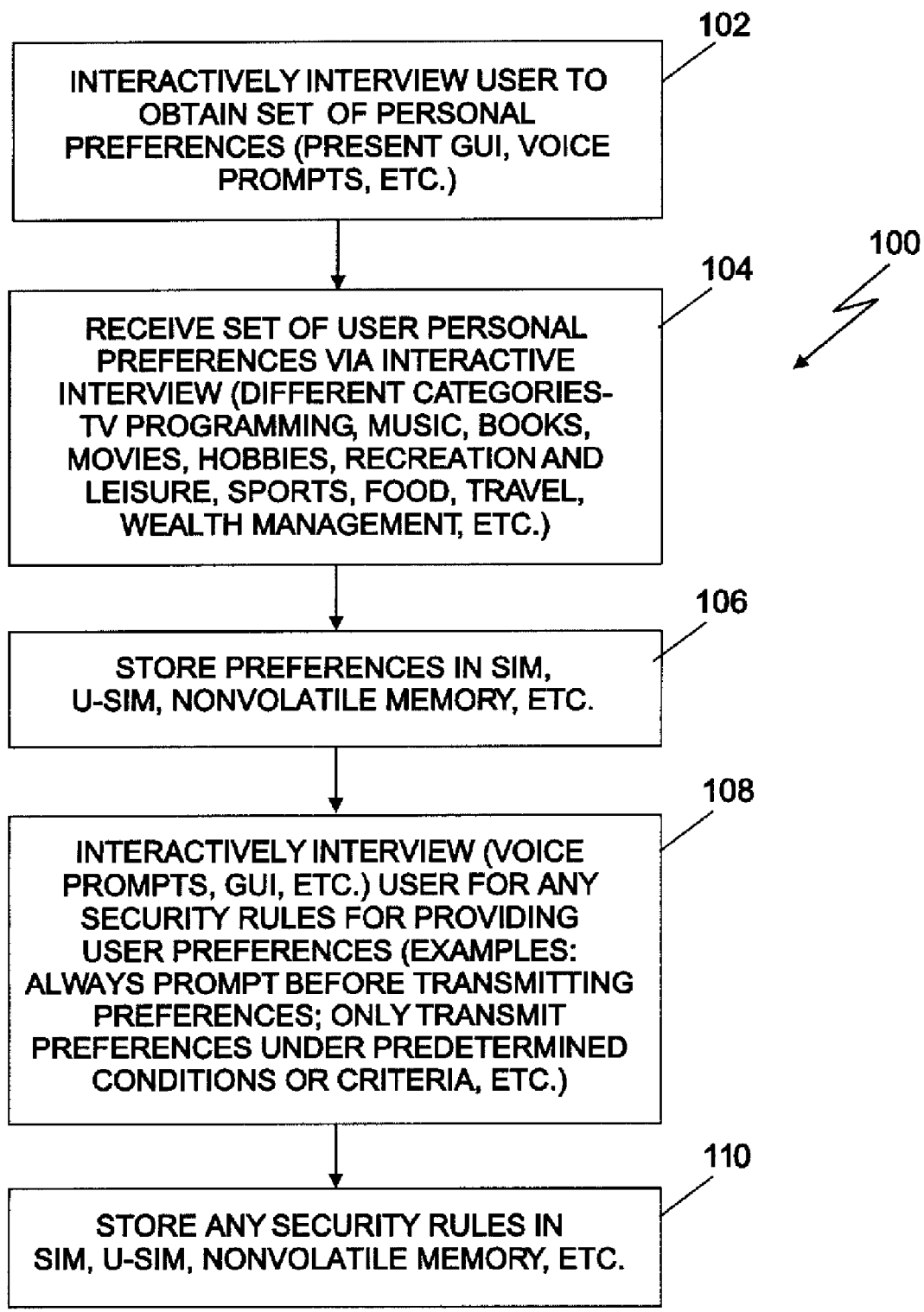

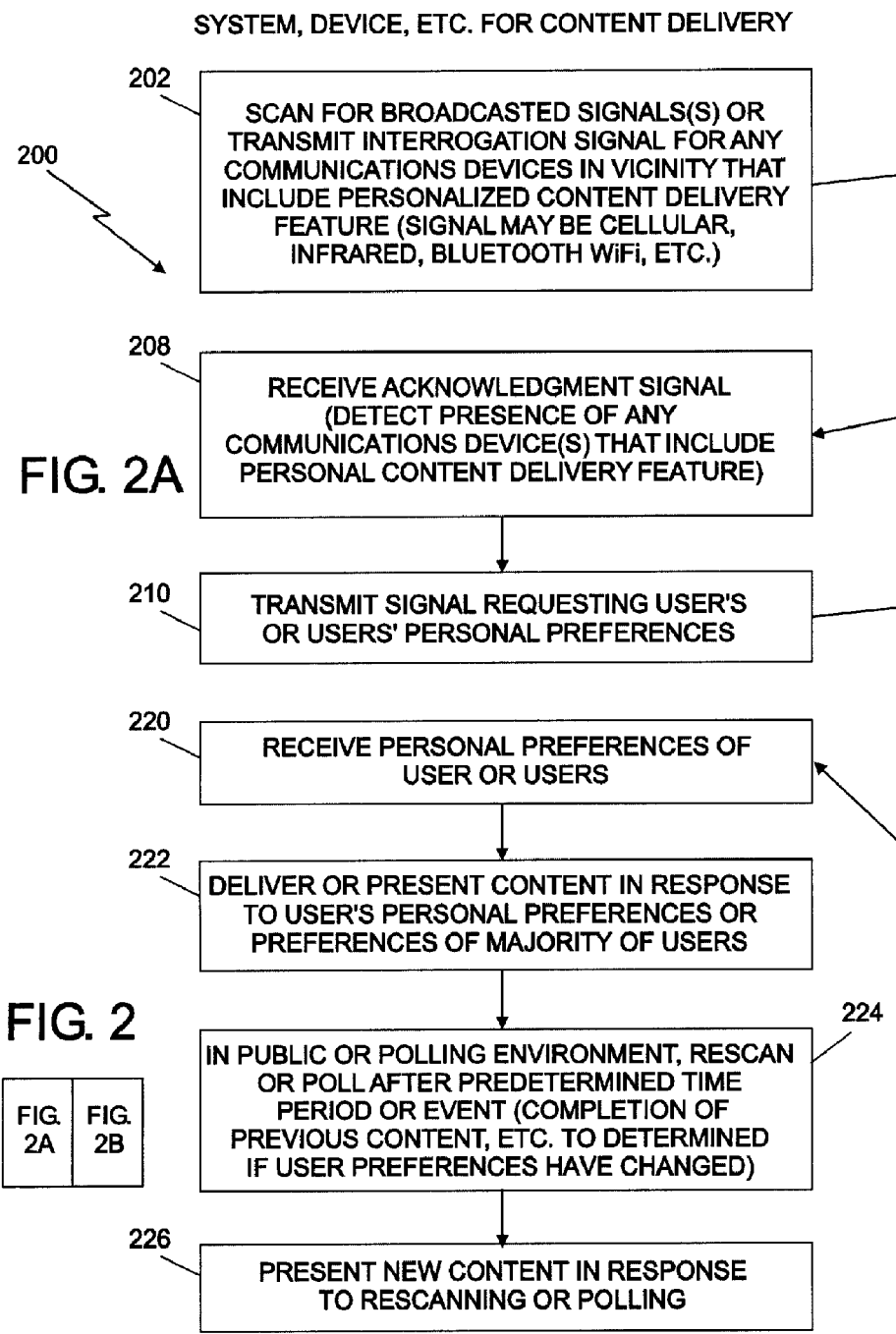

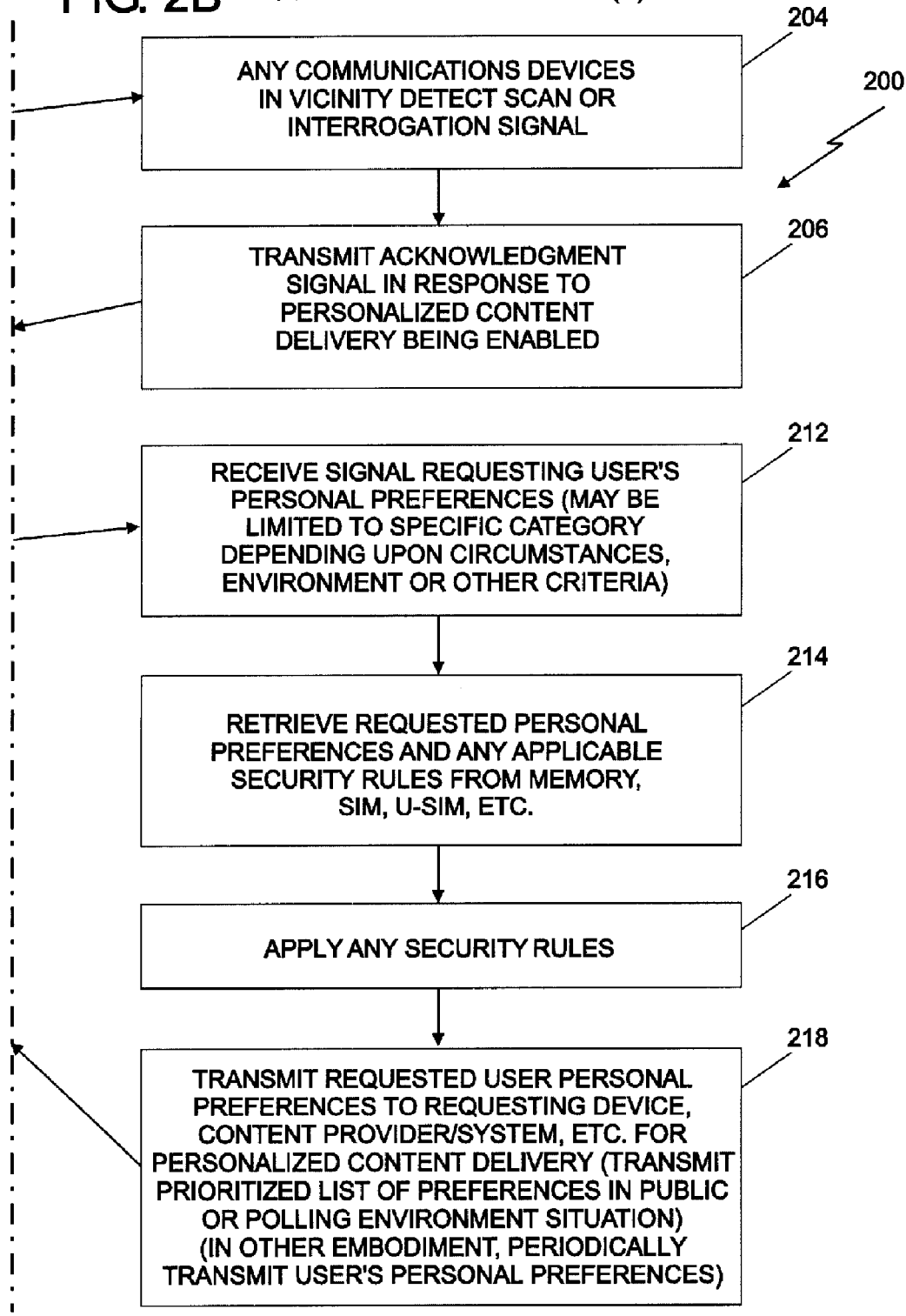

COMMUNICATIONS DEVICE, SYSTEM AND METHOD FOR PERSONALIZED CONTENT DELIVERY

BACKGROUND OF THE INVENTION

The present invention relates to communications devices and systems, and more particularly to a communications device and method for personalized content delivery to a user.

At certain times or under some circumstances, providing specific content or information to an individual or group of individuals may be advantageous. For example, in a waiting area, such as a gate at an airport, a doctor's waiting room, an auto repair facility or the like, providing television programming or other multi-media content, music or the like directed to the personal preferences of those present may be highly desirable. However, accomplishing such may be impractical, if not impossible because of people's reluctance to contact strangers about such matters and not wanting to intrude on the sensibilities of others. Another example where providing specific content based on an individual's preferences may involve when a shopper is looking for a particular item or type of item or product. Time could be saved shopping if specific items or products and features could be automatically presented to the shopper to determine if the store has what the shopper desires without the shopper having to enter the store or search extensively through the store.

BRIEF SUMMARY OF THE INVENTION

In accordance with an embodiment of the present invention, a method for personalized content delivery may include transmitting a signal to request a user's personal preferences. The user's personal preferences may be stored in one of a communications device, a subscriber identity module (SIM), a universal subscriber identity module (U-SIM) or other memory. The method may also include delivering a specific content in response to one of the user's personal preferences or personal preferences of a majority of users.

In accordance with another embodiment of the present invention, a method for personalized content delivery may include receiving a request for a user's personal preferences. The method may also include retrieving the user's personal preferences from one of a memory of a communications device, a SIM, a U-SIM or the like. The method may further include transmitting the requested user's personal preferences to a requesting system or content provider.

In accordance with another embodiment of the present invention, a method for storing personal preferences may include interactively interviewing a user to obtain the user's personal preferences. The method may also include storing the user's personal preferences in one of a memory of a communications device, a SIM, a U-SIM or the like.

In accordance with another embodiment of the present invention, a system for personalized content delivery may include a content provider adapted to transmit a signal to request a user's personal preferences. The user's personal preferences may be stored in one of a communications device, a SIM, a U-SIM or other memory. The content provider may also be adapted to deliver a specific content in response to one of the user's personal preferences or personal preferences of a majority of users.

In accordance with another embodiment of the present invention, a communications device may include a personalized content delivery feature for personalized content delivery based on a user's personal preferences. The communications device may also include a receiver to receive a request for the user's personal preferences. The communications device may further include a transmitter to transmit the requested user's personal preferences to a requesting system or content provider.

In accordance with another embodiment of the present invention, a computer program product for personalized content delivery may include a computer readable medium having computer readable program code embodied therein. The computer readable medium may include computer readable program code configured to receive a request for a user's personal preferences. The computer readable medium may also include computer readable program code configured to retrieve the user's personal preferences from one of a memory of a communications device, a SIM, a U-SIM or the like. The computer readable medium may also include computer readable program code configured to transmit the requested user's personal preferences to a requesting system or content provider.

In accordance with another embodiment of the present invention, a method of personalized content delivery may include retrieving a user's personal preferences from one of a memory of a communications device, a SIM, a U-SIM or the like. The method may also include periodically transmitting the user's personal preferences to any personalized content delivery provider or providers that may be in a vicinity of the communications device without the communications device first being requested to do so by a personalized content delivery device.

In accordance with another embodiment of the present invention, a method for personalized content delivery may include scanning for a broadcasted signal or signals indicating a user's personal preferences. The user's personal preferences may be stored in one of a memory of a communications device, a SIM, a U-SIM or other memory. The method may also include delivering a specific content in response to one of the user's personal preferences or personal preferences of a majority of users being received by a content provider.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIG. 1 is a flow chart of an example of a method for obtaining a user's personal preferences for delivery of personalized content to the user in accordance with an embodiment of the present invention.

FIGS. 2A and 2B (collectively FIG. 2) are a flow chart of an example of a method for delivering personalized content to a user in accordance with an embodiment of the present invention.

DETAILED DESCRIPTION OF THE INVENTION

Figure 3:
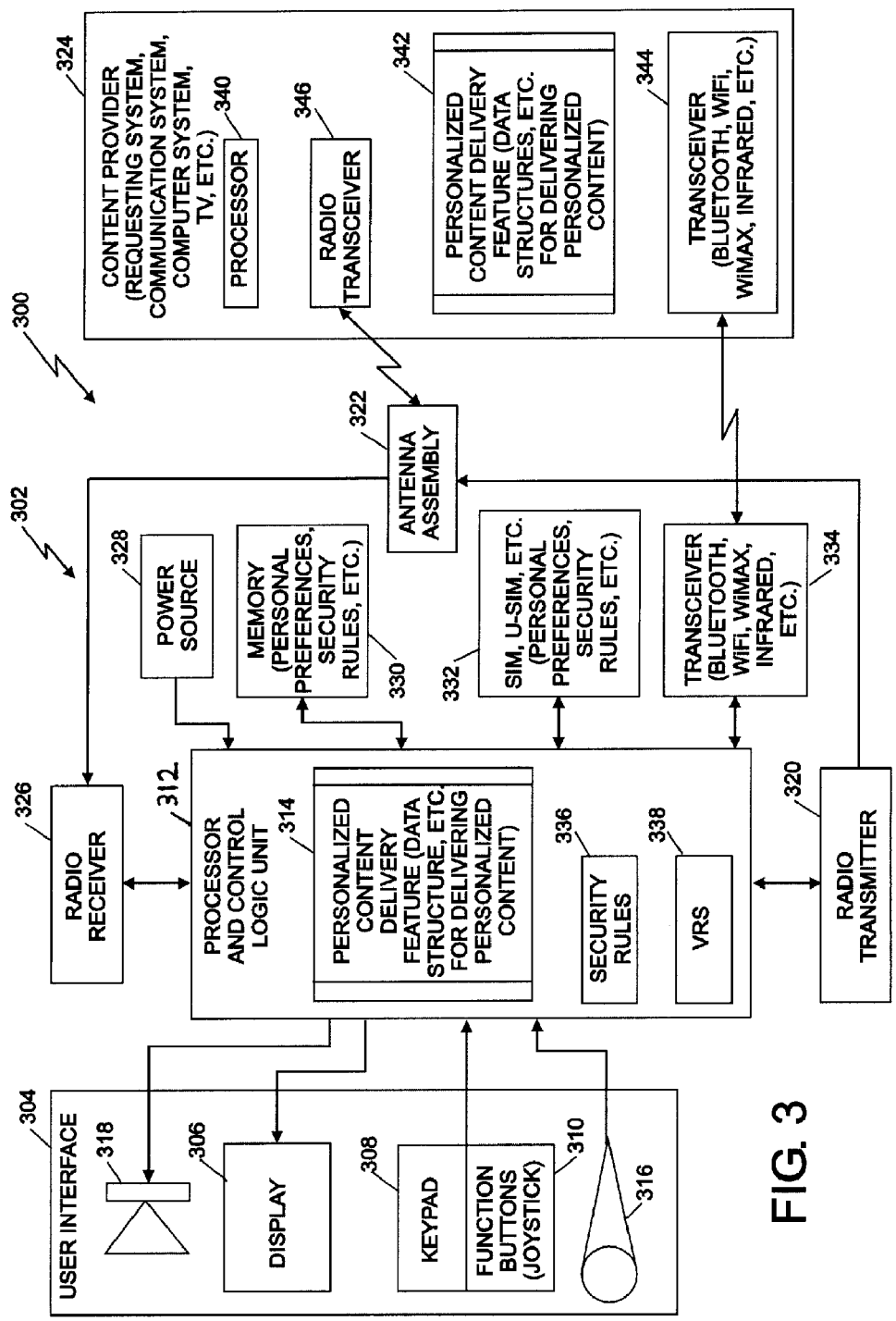
FIG. 3 is a block schematic diagram of an exemplary system and communications device for delivery of personalized content in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include some or all of the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a flow chart of an example of a method 100 for obtaining a user's personal preferences for delivery of personalized content to the user in accordance with an embodiment of the present invention. In block 102, the user may be interactively interviewed to obtain a set of personal preferences. In one embodiment of the present invention, a communications device or the like may present a graphical user interface (GUI) on a display of the communications device into which a user may enter personal preferences. The personal preferences may be entered into the GUI via a key pad, keyboard or similar input device associated with the communications device or via a voice recognition feature. In another embodiment of the present invention, the interactive interview may be via voice prompts to which the user may respond via a voice recognition feature or the like as described in more detail with respect to the communications device 302 in FIG. 3.

In block 104, a set of the user's personal preferences may be received by the communications device via the interactive interview similar to that just described. The set of user personal preferences may include a plurality of different categories. Examples of the different categories of user personal preferences may include television programming, such as news, sports, drama, comedy, action or the like; music; movies; books; hobbies; recreation and leisure; sports; wealth management; food; travel or similar categories of personal interests.

In block 106, the set of user personal preferences may be stored in a subscriber identity module (SIM), a universal subscriber identity module (U-SIM) or a Universal Mobile Telecommunications System SIM (UMTS-SIM) associated with a cellular phone or the like. In accordance with another embodiment of the present invention, the user personal preferences may be stored in a nonvolatile memory of a communications device, such as a cell phone or the like; or some other data storage feature of a communications device.

In block 108, a user may be interactively interviewed for any security rules with respect to providing the user's personal preferences over the air or otherwise. This feature may prevent the user's personal preferences from being provided under some circumstance or when the user does not want such information to be provided. Examples of security rules may include always prompting the user before transmitting preferences; only transmitting preferences under predetermined conditions or criteria or in chosen locations; to only transmit preferences to select groups of content providers or to all content providers with the exclusion of certain select groups of content providers; or other security precautions.

In block 110, the set of security rules may be stored in a subscriber identity module (SIM), universal subscriber identity module (U-SIM) or Universal Mobile Telecommunications System SIM (UMTS-SIM) associated with a cellular phone or the like. In accordance with another embodiment of the present invention, the security rules may be stored in a nonvolatile memory of a communications device, such as a cell phone or the like; or some other data storage feature of a communications device.

FIG. 2 is a flow chart of an example of a method 200 for delivering personalized content to a user or a user's communications device in accordance with an embodiment of the present invention. Examples of actions or functions which may be performed by a system, device or the like for content delivery are depicted on the left in FIG. 2 and examples of actions or functions which may be performed by a communications device, cell phone or the like are depicted on the right in FIG. 2.

In block 202, a content provider, system or device for content delivery may scan for any communications devices within range or a vicinity of the content provider that may include a personalized content delivery feature. The content provider, system or device for content delivery may scan for a broadcasted signal or signals indicating a user's or a plurality of users' personal preferences for content delivery. In this embodiment of the present invention, the communications device or devices may continually broadcast their preferences without first being interrogated by the content provider, system or device.

In another embodiment of the present invention as also indicated in block 202, the content provider, system or device may transmit an interrogation signal, polling signal or similar signal to any communications devices within range that may include a personalized content delivery feature or the like. The signal may be a cellular phone type signal, an infrared signal, a Bluetooth signal, a WiFi (Wireless Fidelity) type signal or any similar signal which allows communication with a non-geographically-fixed device.

In block 204, any communications devices within range may detect the interrogation signal. In block 206, the communications device or devices may transmit an acknowledgement signal. The acknowledgement signal may be transmitted in response to the communications device including a personalized content feature, the feature being enabled and the communications device not being "hidden" to the interrogating content provider by virtue of any security rules that may be stored in the communications device. In block 208, the content provider or system may receive the acknowledgement signal. By receiving the acknowledgement signal, the content provider or system detects the presence of any communications devices within range that may include a personal content delivery feature.

In block 210, the content provider or system may transmit a signal or signals requesting a user's or users' personal preferences, if multiple communications devices are present, such as at a gate at an airport, commuter train, waiting area or other public location. In block 212, the signal requesting the user's personal preferences may be received by each of the communications devices that may be within range of the content provider or system. The personal preferences may be limited to a specific category depending upon circumstances, the environment or other criteria. For example, at an airport gate, only TV programming, travel or food preferences might be solicited. In a doctor's waiting room, an elevator or the like, the requested preference categories might be limited to music preferences only. For a group of travelers destined for a resort area, perhaps only preferences related to the resort area, such as dining, recreation and leisure, sports or the like might be requested. If the user is shopping, certain articles or items may be presented on a computer system, kiosk or the like proximate to the store's entrance or in a window of the store according to the user's preferences. In this manner, the shopper can review articles or items of interest to determine whether the shopper wants to enter the store for a closer look at an article or to purchase the item. Directions to the article or item of interest in the store may also be provided. The shopper may also interactively purchase the item using the communications device so that the purchased item may be picked up at a special desk or window without having to locate the item and wait in a checkout line.

In another embodiment of the present invention, the content provider or system may only transmit a signal or signals requesting personal preferences as in block 210 without first detecting whether any communications devices are within range similar to that described in blocks 202-206. In this manner the content provider can detect any communications devices within range by receiving the user personal preferences in response to a request or request signal.

In block 214, the communications device may retrieve the requested personal preferences from memory, a SIM, U-SIM or the like. The communications device may also retrieve any applicable security rules from memory, a SIM, U-SIM or the like. In block 216 any security rules may be applied, such as those previously described. In block 218, the requested user personal preferences may be transmitted to the requesting device, content provider, system or the like. In a public or polling environment or situation, the user personal preferences may be prioritized in a list.

In another embodiment, a communications device may periodically transmit a user's personal preferences to any personalized content delivery provider or providers that may be in a vicinity or range of the communications device without the communications device first being requested to do so by a personalized content delivery provider, device or system. The personalized content provider or device may then deliver a specific content in response to one of the user's personal preferences or personal preferences of a majority of users received by the content provider.

In block 220, the personal preferences of the user or users may be received by the content provider or system. In block 222, the specific content may be delivered or presented in response to the user's personal preferences or preferences of a majority of users within range or a vicinity of the content provider or system.

In block 224, the content provider or system may rescan or poll after a predetermined time period or event to determine if user preferences have changed. For example, the content provider may rescan or poll after completion of previous content or programming, or a similar event to determine if a new user or group of users is now present and user's preferences have, therefore, changed. In block 226, new content may be presented or delivered in response to rescanning or polling and a change in user personal preferences.

FIG. 3 is a block schematic diagram of an exemplary system 300 and communications device 302 for delivery of personalized content in accordance with an embodiment of the present invention. The communications device 302 may be a cordless telephone, cellular telephone, personal digital assistant (PDA), communicator, computer device or the like and is not unique to any particular communication standard, such as Advanced Mobile Phone Service (AMPS), Digital Advanced Mobile Phone Service (D-AMPS), Global System for Mobile Communications (GSM), Code Division Multiple Access (CDMA) or the like. The design of the communications device 302 illustrated in FIG. 3 is for purposes of explaining the present invention and the present invention is not limited to any particular design.

The communications device 302 may include an operator or user interface 304 to facilitate controlling operation of the communications device 302 including initiating and conducting phone calls and other communications. The user interface 304 may include a display 306 to provide visual signals to a subscriber or user as to the status and operation of the communications device 302. The display 306 may be a liquid crystal display (LCD) or the like capable of presenting color images. The display 306 may provide information to a user or operator in the form of images, text, numerals, characters, a graphical user interface (GUI) and the like. The display 306 may present a GUI for the user to enter personal preferences for each of the different categories of preferences similar to that described above with respect to method 100 of FIG. 1.

The user interface 304 may also include a keypad 308 and function keys or buttons 310 including a point device, such as a joystick or the like. The keypad 308, function buttons and joystick 310 permit the user to communicate commands to the communications device 302 to dial phone numbers, initiate and terminate calls, establish other communications, such as access to the Internet, send and receive email, text messages and the like. The keypad 308, function buttons and joystick 310 may also be used to control other operations of the communications device 302.

The display 306, keypad 308, and function buttons 310 may be coupled to a main processor and control logic unit 312. The main processor and control logic unit 312 may be a microprocessor or the like. The main processor and logic unit 312 may include a personalized content delivery feature 314. Some of the functions and operations described with respect to method 100 of FIG. 1 and method 200 of FIG. 2 may be embodied in the personalized content delivery feature 314. The personalized content delivery feature may be embodied in hardware, firmware, software (data structures for delivering personalized content) or combinations of both. The main processor and logic unit 312 may also include other data structures, software programs, computer applications and the like to encode and decode control signals; perform communication procedures and other functions as described herein.

The user interface 304 may also include a microphone 316 and a speaker 318. The microphone 316 may receive audio or acoustic signals from a user or from another acoustic source. The microphone 316 may convert the audio or acoustic signals to electrical signals. The microphone 316 may be connected to the main processor and logic unit 312 wherein the main processor and logic unit 312 may convert the electrical signals to baseband communication signals. The main processor and control logic unit 312 may be connected to a transmitter 320 that may convert baseband signals from the main processor and control logic unit 312 to radio frequency (RF) signals. The transmitter 320 may be connected to an antenna assembly 322 for transmission of the RF signals to the communication medium or system, such as content provider 324. The content provider 324 may be a communications system, computer system, television, or other type requesting system or device that requests user personal preferences for delivering personalized content to the user or group of users.

The antenna assembly 322 may receive RF signals over the air and transfer the RF signals to a receiver 326. The receiver 326 may convert the RF signals to baseband signals. The baseband signals may be applied to the main processor and control logic unit 312 which may convert the baseband signals to electrical signals. The processor and control unit 312 may send the electrical signals to the speaker 318 which may convert the electrical signals to audio signals that can be understood by the user.

A power source 328 may be connected to the main processor and control logic unit 312 to provide power for operation of the communications device 302. The power source 328 may be a rechargeable battery or the like. The communications device 302 may also include at least one data storage device or memory 330. The memory 330 may store lists of phone numbers. Examples of the lists may include phone numbers entered and stored by action of the user, such as in a phonebook portion of the memory 330, phone numbers for calls that have been missed or not answered, phone numbers that have been called by the communications device 302 and the like. The memory 330 may be a computer-readable medium to store computer-executable or computer-usable instructions or data structures, such as the data structures to perform special operations or functions such as those described in accordance with embodiments of the present invention.

In another embodiment of the present invention, the communications device 302 may also include a SIM 332, U-SIM or the like to store a user's personal preferences and other subscriber information.

The communications device 302 may also include a transceiver 334 for short or medium range communication with other devices and systems, such as the content provider 324 or the like. The transceiver 334 may be a Bluetooth, WiFi, infrared, WiMAX or other technology short or medium range transceiver. WiMAX is an air interface standard (IEEE 802.16) for fixed broadband wireless metropolitan access networks (MANs). The transceiver 334 may be used to receive requests for user personal preferences and to transmit such preferences to a content provider, such as content provider 324 or the like, similar to that described with respect to the method 200 in FIG. 2.

The communications device 302 may also include security rules 336 and a voice recognition system (VRS) 338 or function. The security rules 336 may be stored in the memory 330 or SIM 332. The security rules may be applied to any requests for user personalized preferences similar to that previously described with respect to Method 200 (FIG. 2). The voice recognition system 338 may be embodied in hardware, software, firmware, a combination thereof or the like and may operate in association with the processor and control logic unit 312. The voice recognition system 338 may be coupled to the microphone 316 to permit a user or operator to control operation of the communications device 302 by voice commands to establish communications or perform other operations or functions. The microphone 316, voice recognition system 338 and speaker 318 may be used in combination to interactively interview the user for entry of the user's personal preferences in accordance with an embodiment of the present invention.

The content provider 324 may include a processor 340 to control operation of the content provider 324 and its associated components. The content provider 324 may be a communications system, computer system, television or any type system or device to request personal preferences and provide personalized content in accordance with embodiments of the present invention.

The content provider 324 may also include a personalized content delivery feature 342. The content delivery feature 342 may facilitate performance of the functions described in FIG. 2 under the system or device for content delivery. The personalized content delivery feature may be embodied in hardware, firmware, software or the like and any combinations thereof.

The content provider 324 or requesting system may also include a Bluetooth, infrared, WiFi, WiMAX or other type short or medium range transceiver 344. The transceiver 344 may transmit requests for user personal preferences and receive the requested preferences similar to that described with respect to method 200 of FIG. 2.

The content provider 324 may also include a radio transceiver 346 to receive microwave, cellular type signals or other signals from a communications device, such as device 302. The radio transceiver 346 may be used in the event a communications device is not equipped with a Bluetooth, infrared, WiFi, WiMAX or other type short or medium range transceiver, such as transceiver 344 in communications device 303 illustrated in FIG. 3 or for some reason a communications device is not using this transceiver.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for personalized content delivery, comprising:
    receiving personal preferences that are transmitted from a plurality of users' mobile cellular phones, the personal preferences being stored in the plurality of users' mobile cellular phones and relating to content that each user prefers to receive in accordance with any security rules established by the user and applied to the user's personal preferences;
    delivering from a content delivery device a specific content to the plurality of users corresponding to the personal preferences of a majority of the users in a predetermined area;
    polling, after a predetermined time period after delivery from the content delivery device of the specific content to the users, to determine any changes in the user personal preferences of the majority of the users in the predetermined area; and
    delivering from the single content delivery device a new specific content to the users in response to detecting a change in the user personal preferences of the majority of users in the predetermined area and after delivery from the content delivery device of the previously presented specific content to the users.

2. The method of claim 1, further comprising transmitting a signal to request the user's personal preferences, wherein the signal to request the user's personal preferences is limited to a specific category or categories based on a content delivery system.

3. The method of claim 1, wherein the predetermined area is a waiting area.

4. The method of claim 1, further comprising:
    transmitting from a fixed location content provider source a signal to interrogate whether any mobile communications devices that includes a personalized content delivery feature including a user's personal preferences available for delivery to the signal transmission source are in a vicinity of the signal transmission source;
    detecting at the fixed location content provider source at least one mobile communications device that includes the personalized content delivery feature including the user's personal preferences available for delivery to the signal transmission source in response to transmitting the interrogation signal; and
    transmitting a signal from the fixed location content provider source to request the user's personal preferences in response to detecting at the signal transmission source at least one mobile communications device that includes the personalized content delivery feature, wherein the user's personal preferences are stored in one of a mobile communications device, a SIM or a U-SIM.

5. A system for performing the method of claim 1.

6. A computer-readable storage medium having computer-executable instructions for performing the method of claim 1.

7. A method for personalized content delivery, comprising:
    transmitting users' personal preferences from a plurality of users' mobile cellular phones to a content delivery system, the personal preferences being stored in the mobile cellular phones and relating to content that each user prefers to receive;
    receiving a specific content from a content delivery device corresponding to personal preferences of a majority of the users in a predetermined area;
    receiving a polling message, after a predetermined time period after receiving the specific content from the content delivery device, to determine any changes in the personal preferences of the majority of the users in the predetermined area; and
    receiving, from the content delivery device, new specific content in response to a change being detected in the personal preferences of the majority of the users in the predetermined area and after receiving, from the content delivery device, the previously-presented specific content.

8. The method of claim 7, wherein transmitting the requested user's personal preferences comprises transmitting a prioritized list of the user's personal preferences.

9. The method of claim 7, further comprising applying any security rules to the user's personal preferences prior to transmitting.

10. A mobile cellular phone, comprising:
a personalized content delivery feature for personalized content delivery based on a user's personal preferences;
a transmitter to transmit from the mobile cellular phones of a plurality of mobile phones user's personal preferences to a requesting system, the personal preferences being stored in the mobile cellular phones and relating to content that each user prefers to receive; and
a user interface to present specific content based on personal preferences of a majority of users in a predetermined area;
a receiver for receiving a polling message, after a predetermined time period after the specific content is presented, to determine any changes in the personal preferences of the majority of the users in the predetermined area; and
wherein new specific content is presented by the user interface in response to a change being detected in the user personal preferences of the majority of users in the predetermined area and after receiving from the content delivery device the previously-presented specific content.

11. The communications device of claim 10, wherein the user's personal preferences are prioritizable for transmission to the requesting system.

12. The communications device of claim 10, further comprising a set of security rules applicable to the user's personal preferences.

13. The communications device of claim 10, further comprising an interactive interview to obtain the user's personal preferences.

14. A computer program product for personalized content delivery, the computer program product comprising:
computer readable program code configured to retrieve the user's personal preferences from a mobile cellular phone;
computer readable program code configured to transmit the user's personal preferences to a content delivery system, the personal preferences being stored in the mobile cellular phones and relating to content that each user prefers to receive;
computer readable program code configured to receive a specific content from a single content delivery device corresponding to personal preferences of a majority of the users in a predetermined area;
computer readable program code configured to receive a polling message, after a predetermined time period after receiving the specific content from the single content delivery device, to determine any changes in the personal preferences of the majority of the users in the predetermined area; and
wherein new specific content is received from the content delivery device in response to a change being detected in the personal preferences of the majority of the users in the predetermined area and after receiving from the single content delivery device the previously-presented specific content.

15. The computer program product of claim 14, further comprising computer readable program code configured to permit a user's personal preferences to be prioritized.

16. The computer program product of claim 14, further comprising computer readable program code configured to apply any security rules to the user's personal preferences prior to transmitting.

17. The computer program product of claim 14, further comprising computer readable program code configured to interactively interview a user to obtain the user's personal preferences.

18. The computer program product of claim 14, further comprising computer readable program code configured to interactively interview a user to obtain any security rules.

19. A method of personalized content delivery comprising:
retrieving a user's personal preferences from a mobile cellular phone, the mobile cellular phone being one of a plurality of mobile cellular phones;
presenting an interface for the user to always allow or always disallow transmission of the user's personal preferences; and
periodically transmitting the user's personal preferences to any personalized content delivery provider or providers that may be in a vicinity of the communications device without the communications device first being requested to do so by a personalized content delivery device in response to the user always allowing the user's personal preferences to be transmitted;
receiving a polling message, after a predetermined time period after receiving specific content from the personalized content delivery device corresponding to personal preferences of a majority of the users in a predetermined area, to determine any changes in the personal preferences of the majority of the users in the predetermined area; and
receiving, from the personalized content delivery device, new specific content in response to a change being detected in the personal preferences of the majority of the users in the redetermined area and after receiving the previously-presented specific content from the personalized content delivery device.

20. The method of claim 19, wherein transmitting the requested user's personal preferences comprises transmitting a prioritized list of the user's personal preferences.

21. A method for personalized content delivery, comprising:
scanning for a broadcasted signal or signals indicating a user's personal preferences, wherein the user's personal preferences are stored in a cellular telecommunications device;
receiving personal preferences that are transmitted from a plurality of users' mobile cellular phones, the personal preferences being stored in the mobile cellular phones and relating to content that each user prefers to receive;
delivering a specific content corresponding to personal preferences of a majority of users in a predetermined area;
polling, after a predetermined time period after delivery of the specific content to the users, to determine any changes in the user personal preferences of the majority of the users in the predetermined area; and
delivering new specific content to the users in response to detecting a change in the user personal preferences of the majority of users in the predetermined area and after delivery of the previously-presented specific content to the users.

22. A system for performing the method of claim 21.

23. A method for personalized content delivery comprising:

receiving personal preferences from a user's cellular telecommunications device proximate to a retail store, the personal preferences being stored in the mobile cellular phones and relating to shopping preferences of the user;

delivering, from a content delivery device, shopping content corresponding to the personal preferences of the user in the predetermined area;

polling, after a predetermined time period after delivery from the content delivery device of the specific content to the user, to determine any changes in the personal preferences of users in the predetermined area; and delivering from the single content delivery device new specific content to the user in response to detecting a change in the personal preferences of the users in the predetermined area and after delivery from the single content delivery device of the previously-presented specific content to the user.

24. The method of claim 23, wherein the content delivery device comprises one of a computer system or a kiosk associated with the retail store, and wherein the shopping content relates to at least one of articles and shopping items of the retail store.

25. A method for personalized content delivery comprising:

receiving personal preferences from a plurality of users' cellular telecommunications devices in a waiting room, the waiting room comprising a television in a predetermined area proximate to the plurality of users, the personal preferences being stored in the mobile cellular phones and relating to multimedia content that each user prefers to the television to play;

playing, from the television, television content corresponding to the personal preferences of a majority of the plurality of the users in the predetermined area;

polling, after a predetermined time period after delivery of the specific content from the television to the users, to determine any changes in the personal preferences of the majority of the users in the predetermined area; and delivering from the television new specific content to the users in response to detecting a change in the user personal preferences of the majority of users in the predetermined area and after delivery of the previously-presented specific content from the television to the users.

\* \* \* \* \*